E. HUMBERT.
MAKING PIG IRON.
APPLICATION FILED MAY 17, 1917.
1,242,442. Patented Oct. 9, 1917.
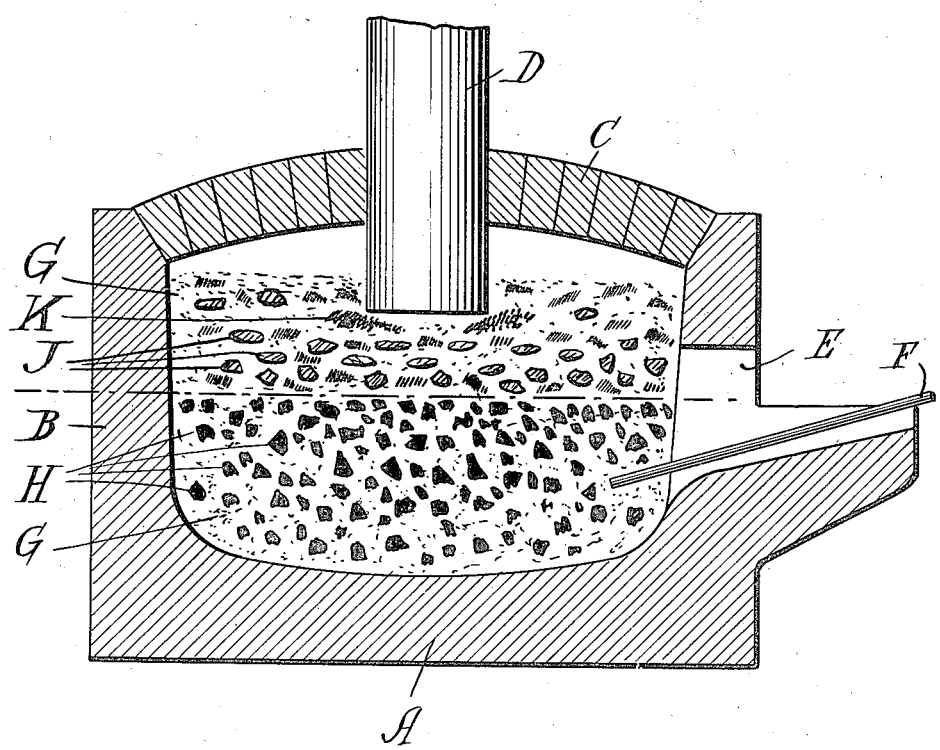
Inventor
Ernest Humbert,
By Attorney

UNITED STATES PATENT OFFICE.

ERNEST HUMBERT, OF WELLAND, ONTARIO, CANADA.

MAKING PIG-IRON.

1,242,442.  Specification of Letters Patent.  Patented Oct. 9, 1917.

Application filed May 17, 1917. Serial No. 169,174.

*To all whom it may concern:*

Be it known that I, ERNEST HUMBERT, a citizen of the Republic of France, residing in Welland, Ontario, Canada, have invented certain new and useful Improvements in Making Pig-Iron, of which the following is a specification.

My invention provides a process of making pig iron from ferrous scrap, such as steel or cast iron or a mixture of these two or a mixture including a portion of pig iron, by which a product of high quality and of any desired composition can be made in an electric furnace very expeditiously and economically.

According to my invention the furnace is charged with the scrap and a quantity of coke or coal or other carbonaceous material proportioned to the carbon content of the scrap and that desired in the pig iron to be produced. Heat is applied by means of the electric current and is assisted by the heat left in the furnace from a previous charge or from a preheating by means of the electric current. The charge, or at least the lower part of it, becomes red hot. I then direct on the hot but still solid charge a stream of air from a long nozzle introduced through an open door of the furnace. This combines with the carbon to form carbon monoxid which is immediately converted into carbon dioxid, burning with a white flame at the mouth of the nozzle and adding a great quantity of heat to that produced by the electric current. The charge melts and as the level of the molten bath rises the nozzle is also elevated to direct the air onto the solid portion of the charge. Blowing the air through the molten mass with its high content of carbon would produce a violent reaction and boiling, with injury to the lining of the furnace and the electrodes and with other disadvantages, and is avoided by the elevation of the nozzle as described.

In making up the charge it is important that the carbonaceous material be introduced into the lower part in order that it shall not merely float on top of the bath but shall be forced down into the same by the weight above it and so caused to combine with the iron.

When the melting of the charge is substantially complete the introduction of air is stopped and the nozzle withdrawn and the door of the furnace shut. If, on sampling the charge, it be found lower in carbon than desired it may be quickly brought up by the following method. Thrust a green pole into the bath and this will cause the metal to boil. Throw coke dust on the metal and it will be readily absorbed thereby. This is a quick method. I have used it to raise the carbon content from 3.00 per cent. to 3.50 per cent. in fifteen minutes. Other methods are known for adding small quantities of carbon to such a molten bath.

When the bath is brought to the desired carbon content additions of lime and spar or sand are made to form the finishing, de-oxidizing "white slag" which is known in electric furnace steel practice, the heat of the current being maintained until the product is brought to the desired perfection. The heat may then be poured.

Or, before pouring, we may add manganese, silicon and the like, in the form of ferro-manganese or ferro-silicon for example, to produce a pig iron containing such elements in desired percentages.

Examples of the process applied to steel scrap are as follows, using a six-ton Heroult arc furnace, illustrated diagrammatically in vertical section on the accompanying drawings.

First example: The raw material is steel shell turnings containing much less than one per cent. carbon (0.45 to 0.55 per cent.) and say 0.05 per cent. phosphorus or at most no higher percentage of phosphorus than is desired in the pig iron to be produced. A thousand pounds of turnings are charged on the bottom, then the six hundred pounds of coal or coke which is needed, and on top of that thirteen thousand pounds of turnings.

The drawings show the furnace hearth A and sides B filled with the charge nearly to the roof C, while the electrode D comes down approximately to the top of the charge so as to strike the arc thereto. A doorway E is opened and a nozzle consisting of a long pipe F, say about ten feet long, and an inch in diameter, is thrust into the lower part of the charge, the nozzle receiving air from a flexible pipe or hose which is connected to the outlet from a blower. At the beginning of the blowing the steel pipe is slightly inclined downward as shown, but during the melting operation the pipe is gradually lifted to about a horizontal position, so as not to extend into the liquid bath. As soon as the charge is completely melted the air is shut off, the pipe removed, and the door of the furnace shut.

The coke or coal may be fine but is preferably in pieces the size of an egg or larger. By charging it in the bottom of the charge in this way it is prevented from floating on top.

Carrying out the process in this way, I found when the charge was melted that the carbon was approximately three per cent. I raised it to three and a half per cent. by the method above described for increasing the carbon content.

Second example: To use material of higher phosphorus content than is desired in the product, the raw material being steel scrap or cast iron scrap, or pig iron or a mixture of these, I work in a slightly different way. The charge illustrated in the drawing is of this character. I charge about a thousand pounds of scrap illustrated roughly at G at the bottom. On top of this, and more or less mixed with it is the coal or coke H, in quantity determined in accordance with the charge. On top of this again is the remainder of the scrap or mixed raw material with lime J and scale or iron ore K sufficient to oxidize the phosphorus and silicon of the charge, the lime being in sufficient quantity to take up the products of such oxidation. The scale or ore or other solid oxidizing material may be replaced entirely or partially by using an increased quantity of air in the blast. When the charge is melted the air supply is cut off and the slag removed in the usual manner. Before removing the slag, however, a test is taken to see that it contains at least five per cent. iron oxid (FeO) which is necessary to hold the phosphorus from going back into the bath. If not, a sufficient amount of scale or ore is added to bring the slag up to this percentage. After the slag is removed additional carbon may be introduced by means of coke dust as previously described. The quantity of coke dust can be calculated when the percentage of carbon to be added and the carbon content of the coke dust and the weight of the metal in the furnace are known. Due allowance has to be made for the loss of a certain amount of the coke in throwing it into the furnace. After obtaining the desired carbon content, a white slag may be added for final purification, and additions of manganese and silicon may be made as above described.

Various other modifications in the composition and in the details of the process may be made by those skilled in the art without departing from the invention as defined in the following claims.

What I claim is:

1. In the making of pig iron the method which comprises charging into an electric furnace a charge including ferrous scrap and carbonaceous material, applying heat by means of the electric current and simultaneously introducing air into the solid portion of the charge to combine with the carbon.

2. In the making of pig iron the method which comprises charging into an electric furnace a charge including ferrous scrap and carbonaceous material, with the carbonaceous material in the lower part of the charge, applying heat by means of the electric current and simultaneously introducing air into the solid portion of the charge to combine with the carbon.

3. In the making of pig iron the method which comprises charging into an electric furnace a charge including ferrous scrap, carbonaceous material and solid oxid in quantity based on the phosphorus content of the charge and the pig iron to be made, substantially as herein described, applying heat by means of the electric current and simultaneously introducing air into the solid portion of the charge to combine with the carbon.

4. In the making of pig iron the method which comprises charging into an electric furnace a charge including ferrous scrap containing less carbon and not substantially more phosphorus than are required in the pig iron to be made and carbonaceous material, applying heat by means of the electric current and simultaneously introducing air into the solid portion of the charge to combine with the carbon.

5. In the making of pig iron the method which comprises charging into an electric furnace a charge of ferrous scrap and carbonaceous material, applying heat by means of the electric current and simultaneously introducing air into the solid portion of the charge to combine with the carbon, continuing these operations until the charge is melted and then stopping the introduction of air and adding carbon to the molten metal.

6. In the making of pig iron the method which comprises charging into an electric furnace a charge including ferrous scrap and carbonaceous material, applying heat by means of the electric current and simultaneously introducing air into the solid portion of the charge to combine with the carbon, continuing these operations until the charge is melted and then stopping the introduction of air and introducing a finishing calcareous slag.

7. In the making of pig iron the method which comprises charging into an electric furnace a charge including ferrous scrap and carbonaceous material, applying heat by means of the electric current and simultaneously introducing air into the solid portion of the charge to combine with the carbon, continuing these operations until the charge is melted and then stopping the introduction of air, and introducing manganese, silicon and the like according to the desired composition of the pig iron.

In witness whereof, I have hereunto signed my name.

ERNEST HUMBERT.